United States Patent [19]

Martensson

[11] Patent Number: 4,731,978
[45] Date of Patent: Mar. 22, 1988

[54] CLOSABLE BAG AND METHOD AND ARRANGEMENT FOR ASEPTIC FILLING THEREOF

[75] Inventor: Karl Martensson, Lund, Sweden

[73] Assignee: Alfa-Laval Food & Dairy Engineering AB, Lund, Sweden

[21] Appl. No.: 870,904

[22] Filed: Jun. 5, 1986

[30] Foreign Application Priority Data

Jul. 8, 1985 [SE] Sweden ................. 8503389

[51] Int. Cl.⁴ ............................................. B65B 43/26
[52] U.S. Cl. ....................................... 53/468; 53/109; 53/381 A; 53/489; 383/66
[58] Field of Search ...................... 53/381 A, 109, 425, 53/426, 468–489, 492, 384; 383/66, 901

[56] References Cited

U.S. PATENT DOCUMENTS

| | | | |
|---|---|---|---|
| 2,171,730 | 9/1939 | Lobl | 383/66 |
| 2,499,150 | 2/1950 | Lobl | 383/66 |
| 2,571,144 | 10/1951 | Lobl | 383/66 |
| 2,777,490 | 1/1957 | Munk | 383/66 |
| 2,930,170 | 3/1960 | Holsman et al. | 53/426 |
| 4,452,030 | 6/1984 | Inada | 53/468 |

Primary Examiner—Robert L. Spruill
Assistant Examiner—Donald R. Studebaker
Attorney, Agent, or Firm—Cyrus S. Hapgood

[57] ABSTRACT

A closable bag of flexible material is provided with a separate inlet member (3) with an opening for filling the bag with a substance, for instance liquid, which inlet member is fastened to the bag. A separate member (7) is arranged for closing the filling opening from inside the bag. The closing member (7) for its closing of the filling opening is arranged for releasable sealing engagement with the inlet member (3), thereby enabling a subsequent partial discharge and reclosing of the bag. The separate inlet and closing members (3, 7) are substantially resistant to deformation and have means (6, 12) for engagement by respective elements of an operating equipment (13–16) arranged outside the bag. The operating equipment includes a filling member connectable to the inlet member, and means for sterilizing a space formed between the filling and closing members.

9 Claims, 4 Drawing Figures

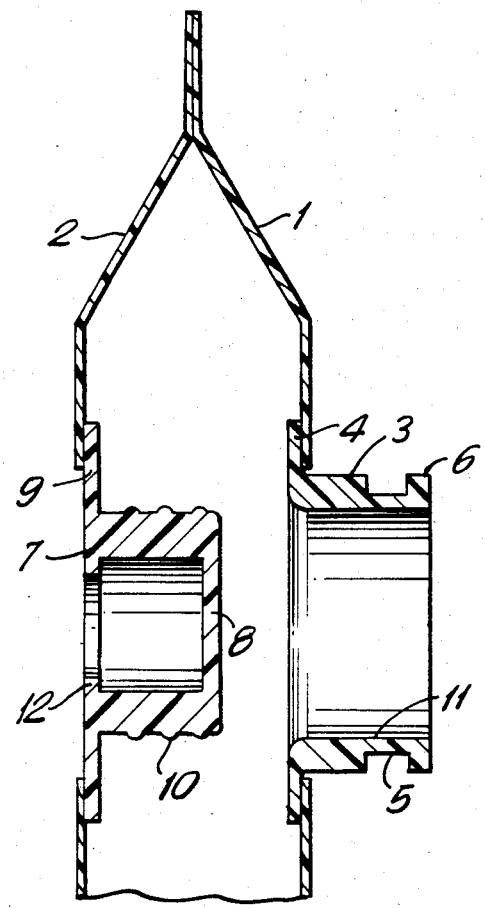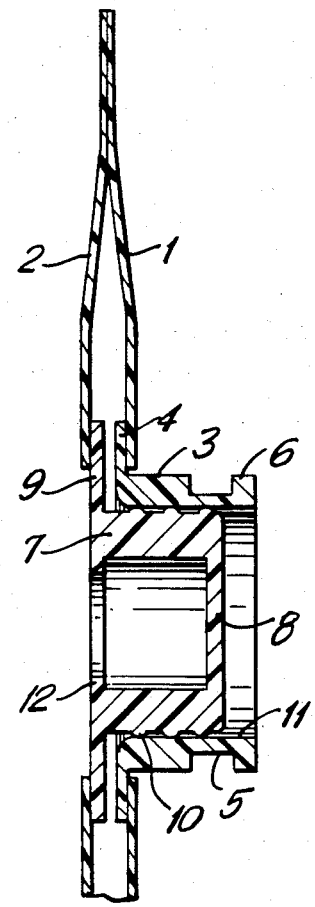
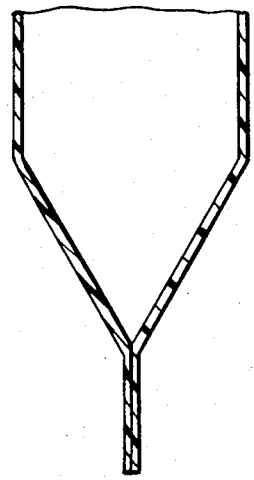
FIG.1      FIG.2

CLOSABLE BAG AND METHOD AND ARRANGEMENT FOR ASEPTIC FILLING THEREOF

The present invention relates to a closable bag of flexible material provided with a separate inlet member connected to the bag and having an opening for filling the bag with material, for instance liquid, and a separate member for closing the filling opening from the inside of the bag. The invention also relates to a method and arrangement for aseptic filling of such a bag.

A bag of the kind defined above is previously known from GB patent application No. 2105291. The known bag in an empty condition prior to filling is internally sterilized and sealed by means of a membrane, which from the outside of the bag is applied across the filling opening of the inlet member. The separate member of the bag for closing of the filling opening from the inside of the bag is flexibly formed and is only partly fastened to the edges of the inlet member around the filling opening. For aseptic filling of the known bag with a sterile or air-sensitive liquid material, such as wine, juices, etc., the bag is placed in a supporting member which engages the inlet member and moves it to abutment against a filling nozzle. The formed space between the latter and the membrane is first sterilized by means of a sterilizing gas. Thereafter the liquid is supplied through the filling nozzle, the membrane being ruptured by the liquid pressure against it so that the filling opening is uncovered. The liquid stream then pushes away the partly fastened separate closing member so much that a free passage is formed into the bag for the liquid. After the filling of the bag, the filling opening is permanently closed by means of a heat sealing device, which seals the separate closing member against the inlet member. The bag thus known is not suited for an initial sterilization of the inlet member by means of steam, as hot steam under high pressure could destroy the membrane on the inlet member. This is a drawback, as heat sterilization by means of steam is safer and easier to control than use of a sterilizing gas.

Another drawback with the known bag is that it is not possible to utilize the inlet member for a total or partial discharge of the bag under aseptic conditions, since the separate closing member after filling is permanently sealed to the inlet member from the inside of the bag.

A further drawback with the known bag is that the filling of it is time-consuming, since the size of the filling opening is limited by the fact that the membrane for strength reasons can have only a relatively small extension. Furthermore, the liquid flow into the bag will be throttled by the separate closing member partly covering the filling opening from the inside of the bag.

The principal object of the present invention is to avoid the drawbacks with the known bag, as described above, by providing a bag of a new kind which has a simpler design, is suited for rapid filling with material under aseptic conditions, and allows steam to be used for the necessary sterilization during the filling operation. Further objects of the invention are to provide a simple method and a simple arrangement for aseptic filling of the bag.

These objects are fulfilled according to the invention by a closable bag of the initially defined kind which is mainly characterized in that the separate inlet and closing members are of stiffer material than the bag and are substantially resistant to deformation, that the closing member for its closing of the filling opening is arranged for releasable sealing engagement with the inlet member, thereby enabling a subsequent partial discharge and reclosing of the bag, and that the inlet and closing members both have means for engagement with an operating equipment arranged outside the bag, such that at least one of said members is movable relative to the other for uncovering or closing the filling opening, said means being adapted for engagement with the operating equipment when the filling opening is uncovered as well as when it is closed and the closing member is in sealing engagement with the inlet member.

In this way the advantage is achieved that steam can be used for sterilization of the space which is formed between the filling member and the deformation resistant closing member before the filling opening is uncovered. Any steam-sensitive membrane of the kind described above is thus not necessary. The steam pressure acting to separate the inlet member and the closing member can be taken up by the operating equipment, as these members both have means for engagement with the latter. Thus, the filling opening is kept safely sealed during the steam sterilization.

As the inlet member and the closing member are of stiffer material than the bag and are substantially resistant to deformation and also have no membrane, the filling opening can be relatively large for rapid filling of the bag. In addition, the operating equipment makes it possible to separate the inlet member from the closing member so much that the closing member completely uncovers the filling opening and consequently does not restrict the inflowing liquid stream during the filling.

The arrangement of the closing member for releasable sealing engagement with the inlet member enables a total or partial discharge of the bag content to take place through the filling opening under aseptic conditions, as by steam sterilization in the same way as described above in connection with filling of the bag.

In a preferred embodiment of the bag according to the invention, the bag comprises two opposed walls, the inlet member being fastened to one of the walls and the closing member being fastened to the other wall opposite to the inlet member. This achieves the advantage that the closing member and the inlet member may perform only a transversal movement relative to each other for the closing or uncovering of the filling opening. This means that the operating equipment can be made simple so that it will function reliably.

Advantageously, the closing member may be used when filling in a way such that inflowing liquid will hit the closing member and be distributed thereby within the bag. Thus, the strength of the bag walls no longer limit the size of the flow.

The invention also relates to a method of aseptic filling of the new bag, which method is characterized mainly by the following successive steps:

the bag, internally sterilized and closed, is placed in an operating equipment which is caused to engage with both the inlet member and the closing member;

the inlet member is connected to a filling member;

the space between the filling member and the closing member is sterilized by means of a fluid, for instance steam, while the filling opening is kept closed;

the inlet member and the closing member are separated by means of the operating equipment for uncovering of the filling opening;

the bag is filled with material by means of the filling member;

the inlet member and the closing member are brought together after the filling operation by means of the operating equipment for closing of the filling opening;

the inlet member is separated from the filling member; and the filled bag is removed from the operating equipment.

The new bag can also be emptied totally or partially under aseptic conditions. In this case the discharge operation comprises the following steps:

the filled bag is placed in a closed condition in an operating equipment, which is caused to engage with both the inlet member and the closing member;

the inlet member is connected to a discharge member;

the space between the discharge member and the closing member is sterilized by means of a fluid, preferably steam, while the filling opening is kept closed;

the inlet member and the closing member are separated by means of the operating equipment for uncovering of the filling opening;

the material in the bag is discharged totally or partially by means of the discharge member;

the inlet member and the closing member are brought together after the discharging operation by means of the operating equipment for closing of the filling opening;

the inlet member is separated from the discharge member; and the totally or partially emptied bag is removed from the operating equipment.

The invention also relates to an arrangement for aseptic filling of the new bag. This arrangement is characterized mainly in that the inlet and closing members both have means adapted for engagement with an operating equipment when the filling opening is uncovered as well as when it is closed, that the operating equipment is arranged for moving at least one of said members relative to the other for uncovering or closing the filling opening, that a filling member is adapted to be connected to the inlet member for filling of the bag, and that means are arranged for sterilization of the space which is formed before and after the filling of the bag between the closing member and filling member while the latter is connected to the inlet member.

In a preferred embodiment of the arrangement according to the invention, the operating equipment is arranged for engagement with and operation of the closing member from the outside of the bag at a distance from the inlet member. It is suitable then to have the closing member sealingly fastened around an opening in the bag wall opposite to the inlet member.

However, it is also possible to arrange the operating equipment for engagement with and operation of the closing member through the filling opening of the inlet member. Then the closing member need not be fastened to the bag. In this case the design of the operating equipment will be more complicated, however. Furthermore, filling of the bag will become more difficult, since parts of the operating equipment will be located in the way of the filling flow into the bag.

The invention will be explained more completely in the following with reference to the accompanying drawings.

Fig. 1 shows a section through a bag according to the invention with an uncovered filling opening.

FIG. 2 shows a section through the same bag but with a closed filling opening.

Figure 3:
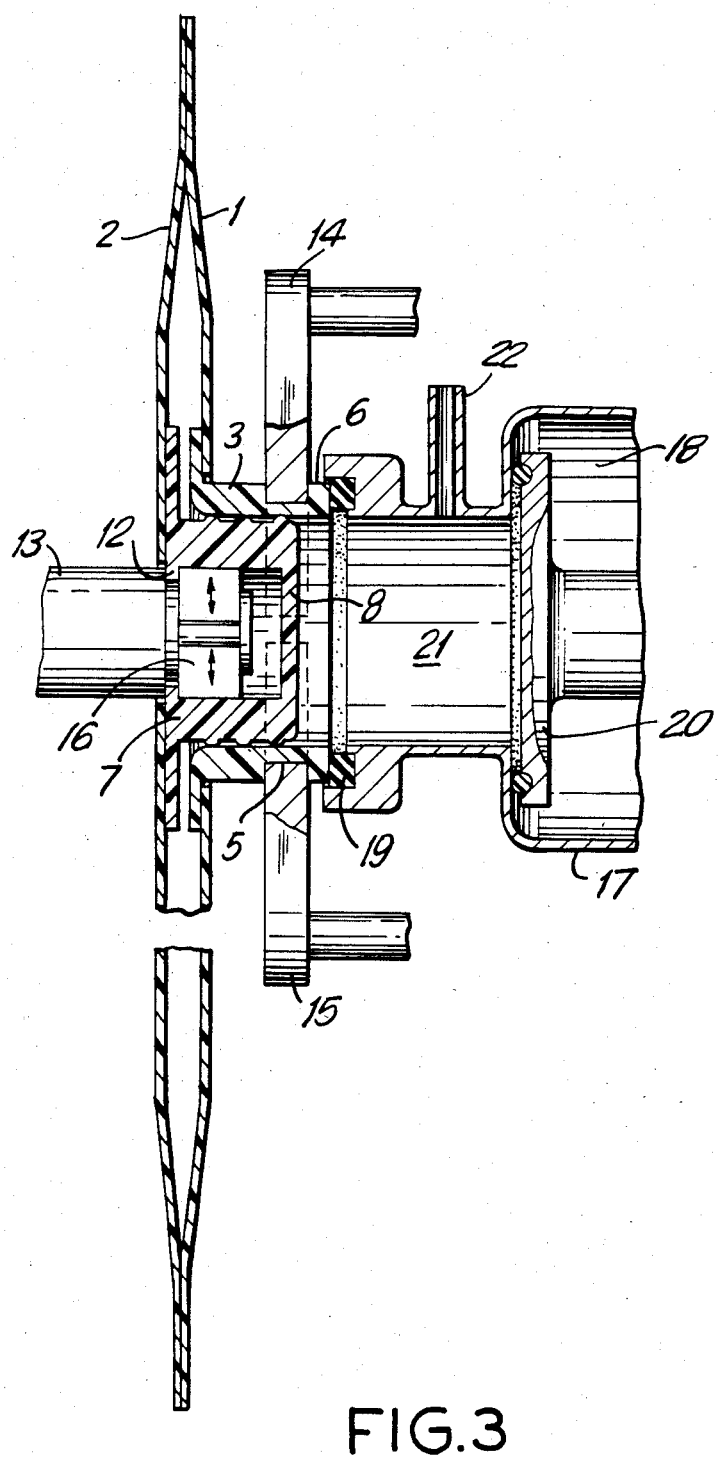
FIG. 3 shows a part of a section through a filling arrangement according to the invention, comprising the same bag with a closed filling opening.
Figure 4:
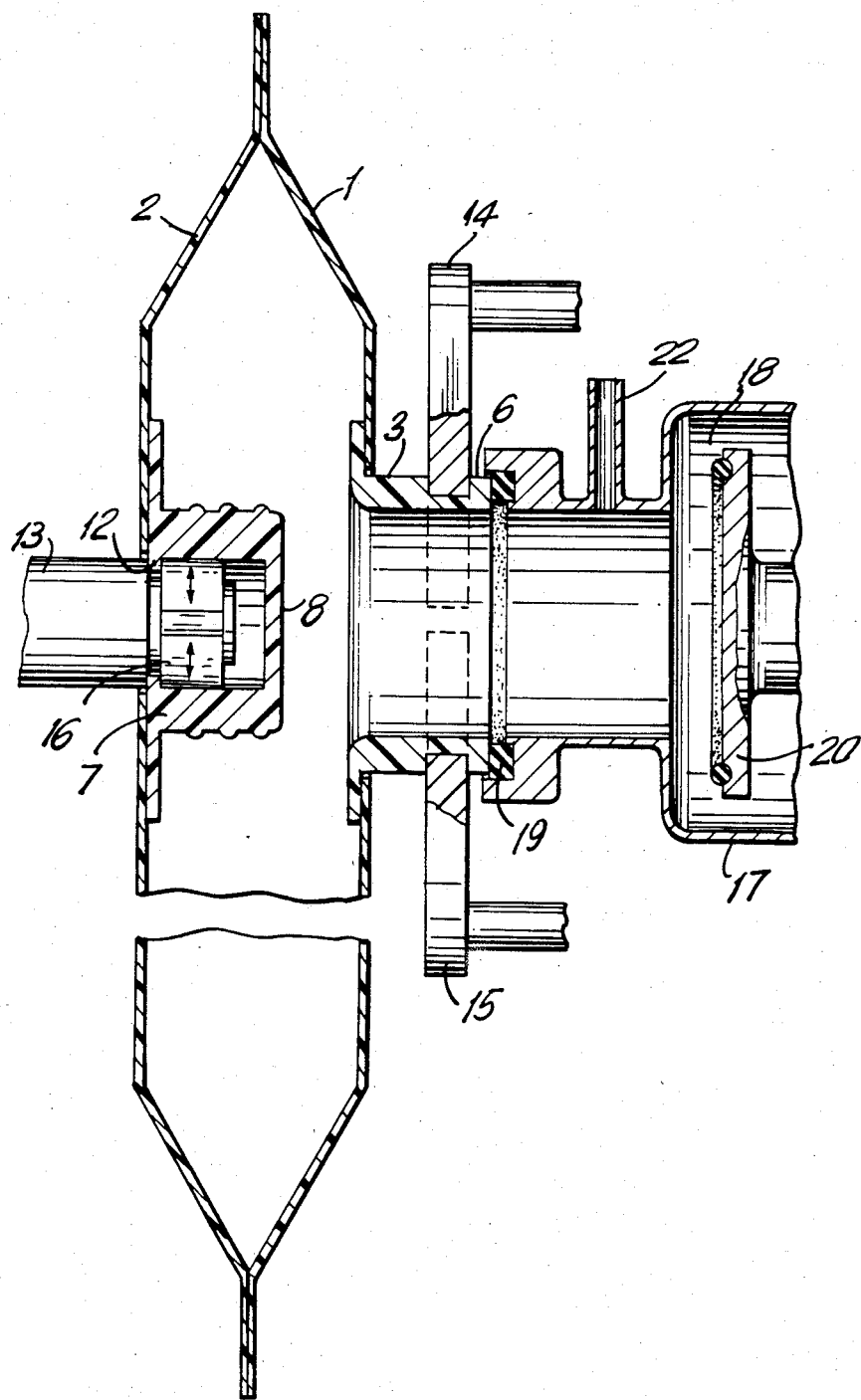
FIG. 4 shows the same section as in FIG. 3 but with the filling opening of the bag uncovered.

As shown in FIG. 1, the bag is made of a thin flexible material and has two opposed walls 1 and 2, which have two aligned holes. An inlet member in the bag comprises a sleeve 3 which, by means of a radially outward directed flange 4 at one end of the sleeve 3, is connected with the surrounding edges of one of the holes in the walls. The flange 4 is fastened to the inside of the bag wall 1, whereas the sleeve 3 extends out from the hole and, with its main part, is situated outside the bag. An annular recess 5 is formed in the outside of sleeve 3 near the end of the sleeve, which is situated outside the bag, whereby a radially outward directed flange 6 is formed at said end for engagement with an operating equipment arranged outside the bag (FIGS. 3 and 4).

A closing member in the bag comprises a sleeve 7 which, at one of its ends, has an end wall 8. Its other end has a radially outward directed flange 9. By means of its flange 9, sleeve 7 is connected with the surrounding edges of the other wall hole in a way such that the flange is fastened to the inside of the bag wall 2. The sleeve 7 extends from the wall hole into the bag with its axis aligned with the axis of the sleeve 3 of the inlet member. Annular protuberances 10 formed on the outside of the sleeve 7 within the bag are arranged to form seals between sleeve 7 and the inside 11 of the sleeve 3 of the inlet member (FIG. 2). A flange 12 extends radially inward from the inside of the sleeve 7 for engagement with said operating equipment arranged outside the bag. Said engagement alternatively could be achieved with a shape of the closing member similar to the one described above for the sleeve 3 of the inlet member. Then the sleeve 7 would have to be formed with a portion extending outside the bag in order to expose the radially outward directed flange.

It is also possible to adapt the operating equipment for engagement with the closing member through the filling opening of the inlet member. In that case the end wall 8 of the sleeve 7 may be provided with a hole such that a radially inward directed flange is formed for engagement with the operating equipment. The sleeve 7 then has to be formed with a sealing end wall placed at the other end of the sleeve 7 and which replaces the radial flange 12.

The sleeves 3 and 7 of the inlet member and the closing member, respectively, preferably are fastened to the bag by heat sealing. Of course, in a case like that, the insides of the bag and the sleeves 3 and 7 consist of a material suited therefor, such as plastics, for instance polyethylene.

The following will describe how the arrangement according to FIGS. 3 and 4 can be utilized in an aseptic filling of the bag.

Before filling, the bag—internally sterilized and in a closed condition—is to be placed in an operating equipment comprising a rod member 13 for engagement with the closing member, and two U-formed forks 14, 15 for engagement with the inlet member. At one of its ends the rod member 13 is provided with a radially expandable device 16, which is introduceable into the sleeve 7 of the closing member past the radial flange 12. The sleeve 7 is first placed on the rod member 13, which engages the sleeve 7 by means of the radially expandable device 16. Thereafter the bag is moved by the rod member 13 such that the inlet member abuts against a filling member 17 with a supply channel 18 for material. The U-formed forks 14, 15 are moved in a radial direction towards the recess 5 of the sleeve 3 for engagement with the sleeve 3, whereafter the forks 14, 15 force this against the filling member 17 via an annular gasket 19 arranged around the opening of the filling member. The filling member 17 is provided with a valve 20, which in this stage keeps the supply channel 18 closed. The formed space 21 between the sleeve 7 of the closing member and the valve 20 of the filling member is sterilized by means of steam, which is supplied through an inlet 22 in the filling member 17.

After the sterilization of the space 21, the sleeves 3 and 7 are separated by moving the rod member 13 in a direction away from the U-formed forks 14, 15 (FIG. 4). The valve 20 is opened and the bag is filled with material by means of the filling member 17. During the filling of the bag, the sleeve 7 is held at a distance from the sleeve 3 such that material entering the bag will hit the end wall 8 and be distributed by this within the bag.

After the filling operation the supply channel 18 is closed by means of the valve 20, and the sleeves 3 and 7 are brought together by moving the rod member 13 in a direction towards the U-formed forks 14, 15 to closing of the filling opening. Before this is completely closed, material residues can be removed from the sleeves 3 and 7 and the filling member 17 by a renewed supply of steam. When the filling opening is completely closed, the U-formed forks 14, 15 are separated from engagement with the sleeve 3; the rod member 13 is moved in a direction away from the filling member 17, the bag being separated from this, and the filled bag is removed from the operating equipment.

In order to prevent undue emptying of the content of the bag, the inlet and closing members may be sealed to each other in a way such that the flanges 4 and 9, which are fastened to the bag walls 1 and 2, are connected with each other, for instance by heat sealing. In a case like this the bag can not be emptied without the formation of a separate discharge opening. However, if emptying of the bag is to be performed through the opening in the inlet member, the described arrangement is also well adapted for a sterile discharge operation. The discharge may be total or partial.

Then the inlet member is connected to a discharge member similar to the filling member 17. After supply of steam for the sterilization of the sleeve 3 of the inlet member and the end wall 8 of the closing member, the filling opening may be uncovered, and any desired quantity of material may be discharged from the bag. Possibly, the discharge member may be identical with the filling member if the latter is supplied with means for emptying of material from the bag.

I claim:

1. In a closable bag including a main part of flexible material, an inlet member separate from but connected to said main part and having an opening for filling the bag with a substance, such as a liquid, and a member separate from but connected to said main part for closing the filling opening from inside the bag, the improvement in which said inlet and closing members are of a rigid material substantially stiffer than said part and substantially more resistant to deformation than said part, said closing member being movable into sealing engagement with said inlet member to close the filling opening and also being releasable from said sealing engagement to allow partial discharge and reclosing of the filling opening, the improvement comprising engagement means on each of said inlet and closing members for engagement with operating equipment outside the bag for effecting relative movement of said members toward and away from each other to uncover and close the filling opening, the operating equipment engaging said engagement means when the filling opening is uncovered and also when the closing member is in sealing engagement with the inlet member to close said opening, the engagement means of each said member being positioned to be operable from one side of the member for both said closing and said uncovering of the filling opening, said closing member including a sleeve having an end wall, said engagement means of the closing member including a flange extending radially inward from the inside of the sleeve of the closing member.

2. In the aseptic filling of a closable bag having a separate inlet member with an opening for filling the bag with a substance, such as liquid, and a separate member for closing the filling opening from inside the bag, the method which comprises placing the bag, while sterilized and closed, in an operating equipment, engaging both the inlet member and closing member with said operating equipment, connecting the inlet member to a filling member of said equipment while forming a space between the filling member and said closing member, sterilizing said space with a fluid such as steam while keeping said filling opening closed, then operating said equipment to separate the inlet member from the closing member and thereby uncover the filling opening, filling the bag with substance from said filling member, then operating said equipment to bring the inlet member and closing member together and thereby close the filling opening, separating the inlet member form said filling member, and removing the filled bag from the operating equipment.

3. The method of claim 2 in which the operating equipment, during said filling step, keeps the closing member spaced from the inlet member and in a position where substance entering the bag will hit the closing member and thereby be distributed within the bag.

4. The method of claim 2 in which, after said filling step but before complete closure of the filling opening by the closing member, residues of said substance are removed from the filling member, the inlet member and the closing member by a fluid such as steam.

5. In combination with a closable bag having a separate inlet member with an opening for filling the bag with a substance, such as a liquid, and a separate member for closing the filling opening from inside the bag, engagement means on each of said inlet and closing members engageable from outside the bag when the filling opening is uncovered and also when said opening is closed, operating equipment comprising elements for engaging said engagement means for moving one of said members relative to the other to alternately uncover and close said opening, a filling member connectable to the inlet member for filling the bag and forming a space between the closing member and the filling member before and after filling of the bag, and means for sterilizing said space while the filling member is connected to the inlet member.

6. The combination of claim 5, in which one of said elements is engageable with the closing member to operate the same from outside the bag at a distance from the inlet member.

7. The combination of claim 5, comprising also a valve movable relative to said filling member to start and stop filling of the bag.

8. The combination of claim 7, in which said valve when positioned to stop filling of the bag is located to close one end of said space remote from the closing member.

9. In a closable bag including a main part of flexible material, an inlet member separate from but connected to said main part and having an opening for filling the bag with a substance, such as a liquid, and a member separate from said main part for closing the filling opening from inside the bag, the improvement in which said inlet and closing members are of a rigid material substantially stiffer than said part and substantially more resistant to deformation than said part, said closing member being movable into sealing engagement with the inlet member to close the filling opening and also being releasable from said sealing engagement to allow partial discharge and reclosing of the filling opening, the improvement comprising engagement means on each of said inlet and closing members for engagement with operating equipment outside the bag for effecting relative movement of said members toward and away from each other to uncover and close the filling opening, the operating equipment engaging said engagement means when the filling opening is uncovered and also when the closing member is in sealing engagement with the inlet member to close said opening, the engagement means of each said member being positioned to be operable from one side of the member for both said closing and said uncovering of the filling opening, said bag part having a hole surrounded by edges, the inlet member including a sleeve fastened to said edges, said engagement means of the inlet member including a flange spaced from said bag part and extending radially outward from the outside of said sleeve, said closing member including a sleeve having an end wall, said engagement means of the closing member including a flange extending radially inward from the inside of the sleeve of the closing member.

* * * * *